United States Patent [19]
Landrum

[11] 3,721,430
[45] March 20, 1973

[54] FUEL PREPARATION SYSTEM FOR CARBURETOR

[75] Inventor: Porter Landrum, Birmingham, Ala.

[73] Assignees: Porter Landrum; Edward Y. McMorris; Porter Laundrum, Jr., all of Birmingham, Ala.; Mrs. William Null, Salina, Kans.; Mrs. Marshall Timberlake; Mrs. Willie Mae McMorris, both of Birmingham, Ala.; part interest to each

[22] Filed: Oct. 26, 1970

[21] Appl. No.: 83,718

[52] U.S. Cl............261/142, 261/41 D, 261/78 R, 123/122 F, 123/122 D, 123/122 H
[51] Int. Cl..............................................F02m 23/14
[58] Field of Search ...261/142, 78 R, 41 D, DIG. 20; 123/122 F, 122 D, 122 H

[56] References Cited

UNITED STATES PATENTS

| 1,637,104 | 7/1927 | Crone | 261/142 |
|---|---|---|---|
| 2,094,959 | 10/1937 | Pulidori | 261/78 R |
| 2,353,865 | 7/1944 | Armstrong | 261/78 R |
| 2,473,808 | 6/1949 | Mallory | 123/122 H |
| 2,655,141 | 10/1953 | Hayden | 123/122 D |
| 2,846,989 | 8/1958 | Eskew | 123/122 D |
| 3,207,492 | 9/1965 | Zikesch | 261/78 A |

*Primary Examiner*—Tim R. Miles
*Attorney*—Jennings, Carter & Thompson

[57] ABSTRACT

Air supply conduit of predetermined dimensions communicates with each idle port of carburetor with means heating air which passes through conduit to a predetermined temperature. Lateral openings in air supply conduit adjacent idle port receives fuel from fuel supply passageway to supply heated mixture of fuel and air to idle port.

9 Claims, 4 Drawing Figures

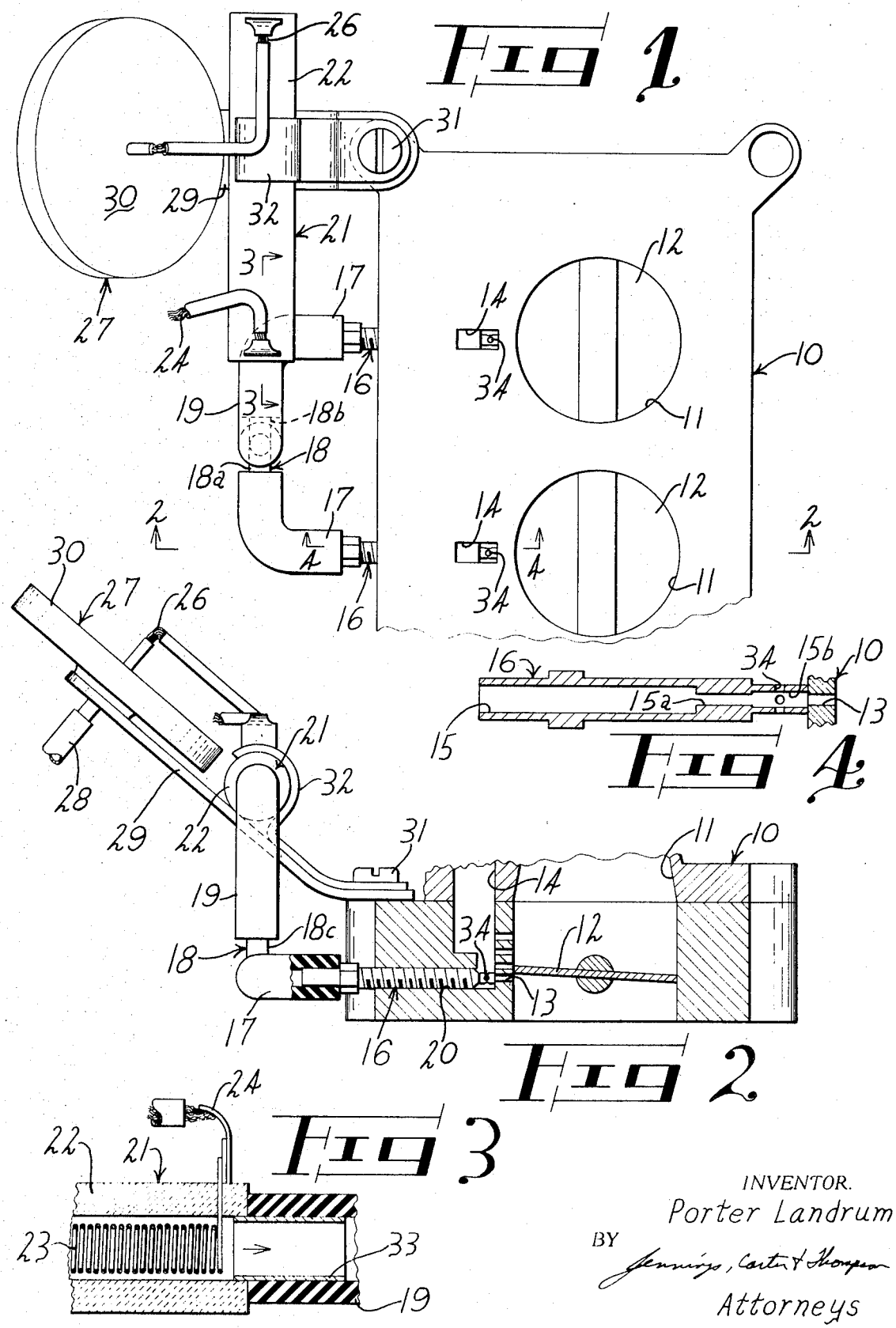

FUEL PREPARATION SYSTEM FOR CARBURETOR

BACKGROUND OF THE INVENTION

This invention relates to a fuel preparation system for the carburetor of an internal combustion engine and more particularly to such a system which greatly increases the combustion of the fuel mixture, thereby greatly reducing air pollution and at the same time greatly reducing fuel consumption.

As is well known in the art to which my invention relates, one of the main sources of air pollution is the discharge of unburnt fuel components from the exhaust of internal combustion engines. Also, incomplete combustion of fuel components results in increased fuel consumption due to inefficient operation of the engine. Since internal combustion engines are operated at low speed or at idling speeds a substantial portion of the time, especially due to the operation of automobiles, trucks, buses and the like in congested areas, a substantial portion of air pollution in cities results from the operation of the primary or idling circuit of the internal combustion engine.

BRIEF SUMMARY OF THE INVENTION

In accordance with my present invention, I bring about a substantial reduction in air pollution and fuel consumption by properly preparing the raw fuel components prior to introduction into the idle port of the carburetor for the internal combustion engine. Air for the primary or idling circuit is heated and mixed properly with the fuel just prior to entering the idle port whereby there is a positive balance of the idle mixture, thus eliminating special tuning and adjustment of the carburetor. By mixing the fuel with heated air immediately prior to introduction into the idle port, I eliminate icing of the primary circuit, reduce carbon formation and provide a smoother running engine having better throttle response and performance. My improved fuel preparation system requires no complicated or expensive mechanism, is trouble free in operation due to the fact that no adjustments are required and may be readily installed on conventional type carburetors.

A fuel preparation system embodying features of my invention is illustrated in the accompanying drawing, forming a part of this application, in which:

FIG. 1 is a top plan view, partly broken away, showing my fuel preparation system applied to the portion of a conventional type carburetor carrying the throttle valve, the remainder of the carburetor being omitted for the sake of clarity;

FIG. 2 is a sectional view taken generally along the line 2—2 of FIG. 1 showing a fragment of a conventional type carburetor attached thereto;

FIG. 3 is an enlarged, fragmental sectional view taken generally along the line 3—3 of FIG. 1; and, FIG. 4 is an enlarged, sectional view taken generally along the line 4—4 of FIG. 1.

Referring now to the drawing for a better understanding of my invention, I show a portion of a conventional type carburetor 10 having a main air passage 11 which includes the usual venturi opening of a predetermined area. A butterfly throttle valve 12 is mounted for pivoted movement in the air passage 11 in the usual manner downstream from the venturi opening. As shown in FIG. 2, a restricted idle port 13 approximately one-eighth inch in length communicates with the air passage 11 downstream from the throttle 12. Also, as shown in FIGS. 1 and 2, the carburetor 10 is provided with the usual fuel supply passageway 14 for supplying fuel to the primary or idling circuit.

Communicating with the idle port 13 for the carburetor 10 is an air supply conduit 16. The discharge end of the air supply conduit 16 is larger than the idle port 13 and surrounds the receiving end of the idle port with the discharge end of the conduit 16 abutting the adjacent portion of the passageway 14, as shown in FIG. 2. As shown in FIG. 4, the receiving end of the conduit 16 is provided with an enlarged bore portion 15 that communicates with a reduced bore portion 15a which in turn communicates with a larger bore portion 15b adjacent the discharge end of conduit 16. The bore portions 15a and 15b are each approximately one-fourth inch in length and the internal cross sectional area of each is dependent upon the diameter of the idle port 13. That is, the internal diameter of idle port 13 varies with different carburetors and the internal bore portions 15a and 15b of conduit 16 must be varied accordingly.

For example, where the diameter of idle port 13 is represented as A, the cross sectional area of 15b is equal to $A^2 \times 1.22$. Accordingly, with the idle port 13 having a diameter A of 0.068 inch the cross sectional area of 15b is approximately 0.00564 square inches. The cross sectional area of 15a is equal to $A^2 \times 0.7$. Accordingly, with the idle port 13 having a diameter A of 0.068 inch, the cross sectional area of 15a is approximately 0.00324 square inches.

Each air supply conduit 16 is connected to a flexible conduit 17. The conduits 17 are connected to oppositely disposed branches 18a and 18b of a T fitting 18. The third branch 18c of the T fitting 18 is connected to a conduit 19 which in turn is connected to one end of a tubular heating unit 21. Accordingly, the conduits 17 are connected to a common conduit 19 which in turn is connected to the tubular heating unit 21.

As shown in FIGS. 1 and 3, the heating unit 21 comprises an elongated cylindrical housing 22 formed of a ceramic, insulating material. Mounted within and extending longitudinally of the cylindrical member 22 is a heating element 23 which is connected at one end by a lead 24 to one terminal of a battery, such as the battery for the internal combustion engine. The other end of the heating element 23 is connected by a lead 26 to a vacuum control switch indicated generally at 27. The heating element 23 is of a capacity to heat the air passing through the heating unit 21 to a temperature ranging from approximately 200° F to 230° F. communicating with the vacuum control switch 27 is a conduit 28 which is connected to the intake manifold of the engine whereby a negative pressure is created within the conduit 28 and the vacuum control switch 27 to actuate the switch 27 immediately upon starting the internal combustion engine. Preferably, the vacuum control switch 27 is provided with a flexible diaphragm 30 at the side thereof connected to the lead 26 whereby upon creating a negative pressure within the conduit 28 and the vacuum control switch unit 27, the diaphragm 30 is drawn inwardly to ground the lead 26 to an electrically conductive supporting bracket 29 which in turn is grounded to the internal combustion engine or the supporting frame therefor, whereby the circuit is completed to the battery by a capscrew 31. The cylindrical member 22 for the heating unit 21 is also secured in place by a support bracket 32 which is held in place by the capscrew 31. Projecting outwardly from one end of the cylindrical housing 22, as shown in FIG. 3, is a tubular member 33 which is adapted to telescope into the adjacent end of the conduit 19 whereby air passing through the cylindrical housing 22 passes into the receiving end of conduit 19 and then into each branch conduit 17 to each air supply conduit 16.

As shown in FIG. 2, the elongated air supply conduit 16 is provided with external threads which engage a threaded opening 20 through the carburetor unit 10. The outside diameter of the conduit 16 radially opposite the bore portion 15b is reduced and projects into the lower portion of the fuel supply passageway 14. Oppositely disposed, lateral openings 34 are provided in the reduced diameter portion of the supply conduit 16, as shown in FIG. 2. The lateral openings 34 extend radially of and perpendicular to the elongated air supply conduit 16 adjacent the discharge end thereof and are spaced angularly from each other with the streams of fuel discharged from oppositely disposed openings 34 contacting each other head-on. The fuel thus flows inwardly of the conduit 16 at angularly spaced locations and then makes a 90° change in direction. Accordingly, the inwardly moving streams of fuel entering the openings 34 contact the moving stream of hot air while the moving streams of fuel and hot air are moving in directions generally perpendicular to each other, thus thoroughly mixing and agitating the mixture. The total cross sectional area of all of the lateral openings 34 is dependent upon the diameter A of the idle port 13 and is equal to $A^2 \times 1.25$. Accordingly, with idle port 13 having a diameter A of 0.068 inch, the combined cross sectional area of all openings 34 is approximately 0.00578 square inches.

From the foregoing description, the operation of my improved fuel preparation system for the carburetor of an internal combustion engine will be readily understood. Immediately upon starting the engine, the reduction in pressure within the conduit 28 draws the diaphragm 30 inwardly to thus close the vacuum control switch 27 thereby connecting the lead 26 to the ground side of the battery. Accordingly, current flows through the lead 24 through the heating element 23 to ground to thus heat the air as it moves through the cylindrical housing 22 to the conduit 19 and then into the branch conduits 17 to the air supply conduit 16. The heating element 23 heats the air passing through the heating unit 21 to a temperature ranging from approximately 200° F to 230° F. The heated air moves at an extremely high speed through the reduced bore portion 15a of the air supply conduit 16 and then moves into the larger bore portion 15b where it engages the oppositely disposed, inwardly moving steams of fuel which enter through the openings 34. The direction of flow of the fuel is changed to 90° prior to moving through the idle port 13. Accordingly, the heated air is confined within the reduced bore portion 15a, which is one-fourth inch in length, and then passes into the larger bore portion 15b, which is also one-fourth inch in length, where it is agitated and completely integrated with the fuel streams just prior to entering the idle port 13. By heating the incoming air with heating unit 21, and introducing the fuel through the openings 34, as set forth hereinabove, the air to fuel ratio ranges from approximately 14.1:1 to 14.7:1. That is, by properly preparing the air introduced through the air supply conduit 16 to the idle port 13, I am enabled to increase the air fuel ratio to bring about more complete combustion of the fuel components as they are introduced into the intake of the engine.

From the foregoing, it will be seen that I have devised an improved system for preparing fuel for the carburetor of an internal combustion engine. By mixing the fuel with a properly prepared stream of hot air immediately prior to entering the idle port, the fuel is atomized to the extent and is at the proper temperature to greatly increase the combustion of the air fuel mixture as it enters the engine. In actual practice, I have increased the miles per gallon on vehicles employing my fuel preparation system approximately 20 percent. Also, by providing a positive balance of the idle mixture I eliminate entirely the necessity of tuning or adjusting the carburetor. That is, the air supply conduit 16 is installed by merely rotating the threaded conduit 16 until the discharge end carrying the openings 34 abuts the adjacent side of the fuel supply passageway 14 with the discharge end of the air supply conduit 16 surrounding the inlet end of the idle port 13. No further adjustments are required. Also, by heating the air which passes through the conduit 16, I eliminate icing of the primary circuit and also reduce carbon formations. Furthermore, by proper preparation of the air fuel mixture entering the idle port 13, I provide a smoother running engine which performs better and has better throttle response and at the same time no complicated or expensive mechanism is required for installing the system on conventional type carburetors.

In actual practice I have reduced the carbon monoxide content discharged from the exhaust of internal combustion engines from approximately 4.8 percent to 0.7 percent at idle speeds. Also, I have increased the air to fuel ratio to a value ranging from 14.1:1 to 14.7:1, whereby a fuel saving of approximately 15 percent is realized.

While I have shown my invention in but one form, it will be obvious to those skilled in the art that it is not so limited, but is susceptible of various other changes and modifications without departing from the spirit thereof.

What I claim is:

1. In a fuel preparation system for a carburetor having a main air passage for conveying fuel and air to the intake of an internal combustion engine and including a throttle in said air passage and a restricted, laterally disposed idle port communicating with said air passage downstream from said throttle:
   a. an air supply conduit communicating with said idle port,
   b. means heating air passing through said air supply conduit to a temperature ranging from approximately 200° F to 230° F,
   c. there being lateral, radially disposed openings in said air supply conduit adjacent said idle port supplying fuel thereto in a direction generally perpendicular to the path of movement of heated air through said air supply conduit so that said fuel is agitated and then mixed immediately with said heated air adjacent said idle port to produce an integrated mixture of fuel and hot air adjacent the point of entry to said idle port, and d. a fuel supply passageway communicating with said lateral openings.

2. A fuel preparation system as defined in claim 1 in which the total cross sectional area of said lateral openings is equal to substantially the diameter of said idle port squared times 1.25.

3. A fuel preparation system as defined in claim 1 in which the air supply conduit and the lateral openings are of a size to supply to the idle port an air to fuel ratio ranging from approximately 14.1:1 to 14.7:1.

4. A fuel preparation system as defined in claim 1 in which two said main air passages are provided with an idle port communicating with each said air passage downstream from a throttle and one end of an air supply conduit communicates with each said idle port with the other ends of the air supply conduits communicating with a common air inlet carrying said heating means.

5. A carburetor as defined in claim 1 in which said air supply conduit is an elongated tubular member having a reduced bore portion which delivers heated air to a larger bore portion adjacent the discharge end thereof, with said lateral, radially disposed openings being in said larger bore portion.

6. A carburetor as defined in claim 5 in which said lateral openings are arranged in oppositely disposed pairs with the streams of fuel delivered from each oppositely disposed pair contacting each other head-on.

7. A fuel preparation system as defined in claim 5 in which the cross sectional area of said reduced bore portion is equal to substantially the diameter of said idle port squared times 0.7.

8. A fuel preparation system as defined in claim 5 in which the cross sectional area of said larger bore portion is equal to substantially the diameter of said idle port squared times 1.22.

9. A fuel preparation system as defined in claim 5 in which said reduced bore portion and said larger bore portion are each approximately one-fourth inch in length.

* * * * *